United States Patent
Yang et al.

(10) Patent No.: US 7,580,392 B2
(45) Date of Patent: Aug. 25, 2009

(54) METHOD AND APPARATUS FOR OPERATION OF A TERMINAL BASED ON RELATIVE GRANT OF A NON-SERVING BASE STATION

(75) Inventors: Tao Yang, Shanghai (CN); Ning Lu, Shanghai (CN); Xueqing Zhu, Shanghai (CN); Mingli You, Shanghai (CN); Zhigang Luo, Shanghai (CN)

(73) Assignee: Alcatel, Paris (FR)

( * ) Notice: Subject to any disclaimer, the term of this patent is extended or adjusted under 35 U.S.C. 154(b) by 405 days.

(21) Appl. No.: 11/346,369

(22) Filed: Feb. 3, 2006

(65) Prior Publication Data

US 2006/0176856 A1     Aug. 10, 2006

(30) Foreign Application Priority Data

Feb. 7, 2005    (CN)  ........................ 2005 1 0023903

(51) Int. Cl.
    H04L 12/26     (2006.01)
(52) U.S. Cl. ........................ 370/331; 370/310; 370/230
(58) Field of Classification Search ........................ None
See application file for complete search history.

(56) References Cited

U.S. PATENT DOCUMENTS

2006/0159016 A1*   7/2006   Sagfors et al. .............. 370/230

OTHER PUBLICATIONS

Samsung: "EUL scheduling: signalling support" 3GPP TSG-RAN WGI, (Online), Sep. 24, 2004, XP-002375260.

TSG-RAN WG2: "CR to TR 25.309 (on Enhanced Uplink)" (Online), Dec. 10, 2004, XP002375261.
S. Parkvall: "UE Grant behaviour" ETSI TSG RAN WGI EUL AH LIST, (Online), Oct. 15, 2004, XP002375262.

* cited by examiner

*Primary Examiner*—Lester Kincaid
*Assistant Examiner*—Phuoc Doan
(74) *Attorney, Agent, or Firm*—Sughrue Mion, PLLC

(57) ABSTRACT

The present invention relates to method and apparatus for operation of a terminal based on Relative Grant of a non-serving based station, the method comprising the terminal performing corresponding processes based on the received relative scheduling grant $RG_N$ from the non-serving base station and according to associated parameters configured by Serving Radio Network Controller (SRNC). A first one of the corresponding processes is the relative scheduling grant $RG_N$ being applied to subsequent HARQ processes until a new relative scheduling grant $RG_N$ is received for an initial transmission; for retransmission determining the amount of resources used for retransmission by integratedly considering power of the initial transmission of the packet to be retransmitted and the grant $RG_N$ in combination with idea of reducing power. A second one of the corresponding processes is that effects of $RG_N$ on subsequent HARQ processes is based on whether a new $RG_N$=DOWN is received for a subsequent HARQ process. A third one of the corresponding processes is that effects of $RG_N$=DOWN on subsequent HARQ processes is reflected on one-off adjusting the maximum amount of available resources for all subsequent HARQ processes. The present invention will achieve the object of enhancing performance of uplink in a system and improving experience for users and have a significant effect on normalization process of HSUPA.

16 Claims, 2 Drawing Sheets

METHOD AND APPARATUS FOR OPERATION OF A TERMINAL BASED ON RELATIVE GRANT OF A NON-SERVING BASE STATION

CROSS-REFERENCE TO RELATED APPLICATIONS

This application is entitled to the benefit of Chinese Patent Application No. CN 200510023903.2 filed on Feb. 7, 2005 with the Chinese Patent Office.

FIELD OF THE INVENTION

The present invention relates to 3G (the 3rd Generation) wireless mobile communication field, particularly to method and apparatus for operation of a terminal based on Relative Grant of a non-serving based station.

PRIOR ART

As an enhanced uplink technique of 3G, HSUPA is mainly used to enhance performance of uplink in a system and improve experience for users. In order to achieve the object, some new techniques are used in transmission of High Speed Uplink Packet Access (HSUPA), such as scheduling policy with Node B (Base Station) and etc., so that new processing and corresponding uplink and downlink signaling are introduced into the base station and the terminals to support the policy so as to achieve the object of enhancing uplink performance of system.

As an uplink technique, the HSUPA shall support Soft Hand-Over (SHO). 3GPP protocol has prescribed that for a terminal user during SHO, a cell is designated as serving cell and others are non-serving ones in active set thereof. Correspondingly, a base station controlling the serving cell is a serving base station, and a base station controlling the non-serving cell is a non-serving base station. Relative Grant (RG) from the non-serving base station contains two formats:

RG=DOWN (decreasing)
RG=HOLD (holding)

3GPP has prescribed the process for performing data processing based on grants of the serving base station by the terminal user, but there is no final conclusion for data processing based on grants of the non-serving base station by the terminal. Therefore, it is one of the problems always concerned in the art how to process $RG_S$ from the non-serving base station by the terminal. A proper solution directed to the above problem is significant for optimizing HSUPA transmission and is necessary for normalization process of 3GPP HSUPA.

The present invention is directed to corresponding solution to the above problem and has a significant effect on normalization process of HSUPA.

SUMMARY OF THE INVENTION

The object of the present invention is to provide method and apparatus for operation of a terminal based on Relative Grant of a non-serving based station in order to optimize HSUPA transmission, enhance performance of uplink in a system and improve experience for users.

The present invention provides a method for operation of a terminal based on Relative Grant of a non-serving based station, characterized in the terminal performing corresponding processes based on the received relative scheduling grant $RG_N$ from the non-serving base station and according to associated parameters configured by Serving Radio Network Controller (SRNC).

In the above method for operation of a terminal based on Relative Grant of a non-serving based station, when the terminal further receives a Hybrid Automatic Retransmission request (HARQ) feedback result and the HARQ feedback result is "correct response", the corresponding process is the relative scheduling grant $RG_N$ being applied to subsequent HARQ processes until a new relative scheduling grant $RG_N$ is received.

In the above method for operation of a terminal based on Relative Grant of a non-serving based station, if the relative scheduling grant $RG_N$ is "DOWN", the amount of resources $R_{actual,i}{}^n$ used for the HARQ processes corresponding to the $RG_N$ in a previous round of transmission is obtained and the value of the amount is modified with a pre-configured adjusting step size $\Delta$ to obtain the amount of available resources for the HARQ processes in a next round of transmission as:

$$R_i^{n+1}=R_{actual,i}{}^n-\Delta \qquad (1)$$

wherein i represents the ith HARQ process, n represents the nth round of transmission, $R_i^{n+1}$ represents the maximum amount of available resources for the ith HARQ process in the n+1th round, $R_i^{n+1}$ will be applied to HARQ Process i+1, HARQ Process i+2, . . . until a new relative scheduling grant $RG_N$ is received; the terminal determines the resultant amount of available resources $R_{acutal,i}{}^{n+1}$, $R_{acutal,i+1}{}^{n+1}$ in the n+1 th round based on $R_j^{n+1}$, j=i, i+1, i+2, . . . and its own current actual status.

In the above method for operation of a terminal based on Relative Grant of a non-serving based station, when the terminal further receives a HARQ feedback result and the HARQ feedback result is "incorrect response", the corresponding process is determining the amount of resources used for retransmission by integratedly balancing amount of transmission resources used for the HARQ process corresponding to the HARQ feedback and effects of the relative scheduling grant $RG_N$="DOWN" on the HARQ process.

In the above method for operation of a terminal based on Relative Grant of a non-serving based station, when the terminal receives $RG_N$="DOWN", the corresponding process is adjusting the amount of resources used for the HARQ process, recording a value of the adjusted amount, when the amount of resources for a subsequent HARQ process is determined, comparing the recorded value with the amount of resources used for the HARQ process with amount of resources to be determined in a previous round of transmission and the minimum is set as the maximum amount of available resources currently used for the HARQ process.

In the above method for operation of a terminal based on Relative Grant of a non-serving based station, when the terminal receives $RG_N$="DOWN", the corresponding process is adjusting the amount of resources used for the HARQ process, recording a value of the adjusted amount, and adjusting the maximum amount of available resources for a subsequent HARQ process as the value.

The present invention also provides an apparatus for operation of a terminal based on Relative Grant of a non-serving based station, characterized in comprising a receiving module for receiving a relative scheduling grant and associated information from the non-serving base station; a configuration module for configuring associated parameters by SRNC; a calculation module, respectively coupled to the above modules, for enabling the terminal to perform corresponding operations based on the received relative scheduling grant and the configured parameters of the SRNC.

The solution proposed in the present invention has the following features:

1) If a terminal user receives ACK, $RG_N$ will be applied to subsequent HARQ processes until a new scheduling grant is received, which reflects the provisions of 3GPP;

2) If a terminal user receives NACK, the user will integratedly consider an initial transmission power of packet and effects of $RG_N$, which reflects the following features defined by 3GPP.

3) The effects of $RG_N$=DOWN on subsequent HARQ processes are reflected step by step and associated with the cases whether $RG_N$=DOWN is received for the subsequent HARQ process. The present invention reduces intense fluctuation in a terminal rate.

4) After the terminal receives $RG_N$=DOWN, the maximum amount of available resources for all subsequent HARQ processes in a next round of transmission is adjusted to reduce intense fluctuation in a terminal rate.

Summing up, the present invention will achieve the object of enhancing performance of uplink in a system and improving experience for users and have a significant effect on normalization process of HSUPA.

DETAILED DESCRIPTION OF THE INVENTION

To facilitate the following discussion, symbols are defined and used as follows:

$RG_N$: Relative Grant generated by a non-serving base station;

ROT: Rise Over Noise (interference);

$R_{actual,i}^j$: the amount of actual-used resources for the ith HARQ process in the jth round of transmission.

$R_{max,i}^j$: the maximum amount of available resources for the ith HARQ process in the jth round of transmission.

I. The Solution with Combination of $RG_N$ and HARQ Feedback Results

When packets are retransmitted, HSUPA suggests considering the following policies:

1) The same resources as an initial transmission are used if allowed.

2) The idea of reducing power resources is considered when retransmission so as to utilize HARQ gain better and to reduce interference raised due to retransmission.

For this feature, the present invention proposes a processing policy that a terminal user integratedly considers a received scheduling grant and a HARQ feedback result.

Since the HARQ feedback result may be ACK or NACK (non-acknowledgement: incorrect response), the terminal will perform different processing for these two responses.

(I) $RG_N$=DOWN and ACK (Acknowledgment: Correct Response)

If there is at least one $RG_N$="DOWN" while the terminal receives ACK, the terminal utilizes the following policy: the grant "DOWN" will be applied to subsequent HARQ processes until a new $RG_N$ grant is received.

If $RG_N$=DOWN, the amount of resources $R_{actual,i}^n$ used for the HARQ processes (the set i HARQ processes) corresponding to the $RG_N$ in a previous round of transmission is obtained and the value of the amount is modified with a pre-configured adjusting step size $\Delta$ to obtain the amount of available resources for the HARQ processes in a next round of transmission as:

$$R_i^{n+1} = R_{actual,i}^n - \Delta \tag{1}$$

wherein i represents the ith HARQ process, n represents the nth round of transmission, n+1 represents the n+1th round of transmission, $\Delta$ represents step size, $R_i^{n+1}$ represents the maximum amount of available resources. The terminal user thinks that $R_i^{n+1}$ as the maximum amount of transmission resources will not result in great interference at the base station, and then $R_i^{n+1}$ will be applied to HARQ Process i+1, HARQ Process i+2, ... until a new $RG_N$ is received. The terminal determines the resultant amount of available resources $R_{acutal,i}^{n+1}$, $R_{acutal,i+1}^{n+1}$ in the n+1th round based on $R_j^{n+1}$, j=i, i+1, i+2, ... and its own current actual status.

Figure 1:
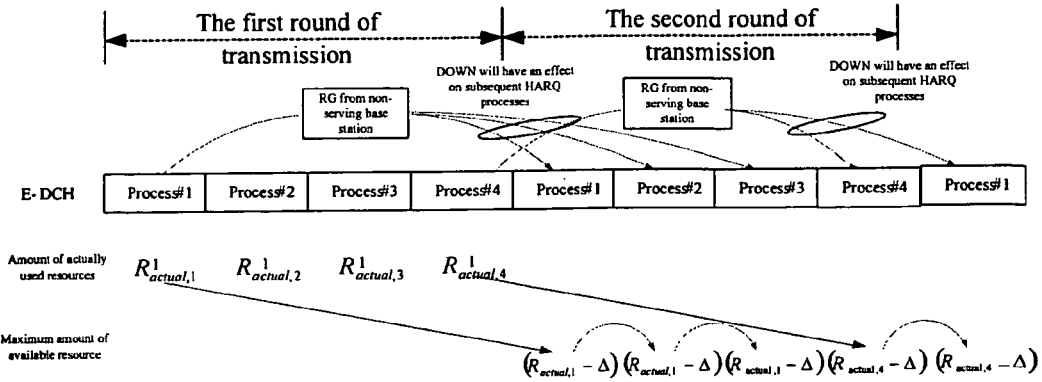
FIG. 1 is an operation schematic diagram for a terminal receiving feedback results of $RG_N$=DOWN and ACK in accordance with the present invention.

As shown in FIG. 1, for facilitating discussion, assume that there are four HARQ processes in a system, and the amount of resources actually used for the respective HARQ processes are $R_{actual,1}^1$, $R_{actual,2}^1$, $R_{actual,3}^1$, $R_{actual,4}^1$ in the first round of transmission. At the beginning of the second round of transmission, $RG_N$=DOWN and ACK corresponding to HARQ Process 1 are received, and the terminal user determines the amount of available resources $R_1^2$ for HARQ Process 1 in the second round of transmission as:

$$R_1^2 = R_{actual,1}^1 - \Delta \tag{2}$$

and then:

The terminal user determines the resultant amount of available resources $R_{actual,1}^2$ based on $R_1^2$ and the current status.

Assume that the received HARQ feedback result for HARQ Process 2 is ACK, and then the terminal user determines the amount of available resources $R_1^2$ for HARQ Process 2 in the second round of transmission and determines the resultant amount of available resources $R_{actual,2}^2$ based on $R_1^2$ and the current status.

As such, the terminal determines the resultant amount of available resources $R_{actual,3}^2$ for HARQ Process 3 in the second round of transmission based on $R_1^2$ and the current status.

Assume that the received $RG_N$ for the fourth HARQ process is $RG_N$=DOWN, and then the terminal user determines the amount of available resources for HARQ Process 4 in the second round of transmission as $R_4^2 = R_{actual,4}^1 - \Delta$ and determines the resultant amount of available resources $R_{actual,4}^2$ based on $R_4^2$ and the current actual status.

Assume that the received HARQ feedback for the first HARQ process for the third round of transmission by the terminal is ACK, and then the terminal determines the resultant amount of available resources for HARQ Process 1 in the third round of transmission as $R_{actual,1}^3$ based on $R_4^2$ and the current actual status.

...

Thus it can seen that the policy contains the following provisions of 3GPP:

$RG_N$=DOWN is applied to a plurality of HARQ processes.

The terminal will be held for a stable period.

Any $RG_N$=DOWN will result in reset of the stable period.

(II) $RG_N$=DOWN and NACK

If at least one $RG_N$="DOWN" is previously received while the terminal receives a feedback of NACK, the terminal integratedly considers the amount of transmission resources used for the HARQ process corresponding to the HARQ feedback and effects of the grant $RG_N$="DOWN" on the HARQ process.

Figure 2:
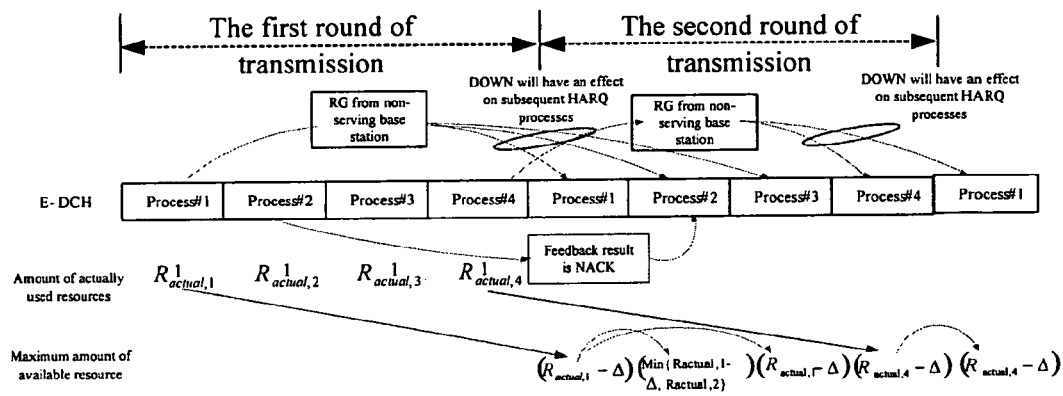
FIG. 2 is an operation schematic diagram for a terminal receiving feedback results of $RG_N$=DOWN and NACK in accordance with the present invention.

As shown in FIG. 2, assume that the terminal receives $RG_N$=DOWN corresponding to HARQ Process 1 at the beginning of the second round of transmission and NACK as the HARQ feedback result for HARQ Process 2 in the second round of transmission, and then the terminal user determines the amount of available resources for HARQ Process 2 in the second round of transmission as: $R_2^2$=MIN($R_{actual,2}^1$, $R_1^2$) and determines the resultant amount of available resources $R_{actual,2}^2$ based on $R_2^2$ and the current actual status of the terminal.

Thus it can seen that the policy contains the following provisions of 3GPP:

The power resources used for the initial transmission shall be considered when retransmission.

De-boosting can be considered for retransmission so as to sufficiently utilize gain of HARQ.

II. The Process Based on Whether a New Grant $RG_N$=DOWN is Received for a Subsequent HARQ Process $RG_N$=DOWN will have an effect on the processing of subsequent HARQ processes. For subsequent HARQ processes, the terminal may receive $RG_N$=DOWN or may not this grant. For this feature, assume that the terminal receives $RG_N$=DOWN at the ith HARQ process, and then it adjusts the maximum amount of current available transmission resources $R_{max,i}^{n+1}$=$R_{actual,i}^n$-$\Delta$ (in the n+1 th round of transmission) for the HARQ process according to the following means, wherein $R_{actual,i}^n$ represents the amount of resources actually used for the ith HARQ process in the nth round of transmission, and the terminal determines the amount of actual available resources for the ith HARQ process in the n+1th round of transmission based on $R_{max,i}^{n+1}$ and the current actual status.

For a subsequent HARQ process (it is set as the jth HARQ process):

For the jth HARQ process, the terminal may receive another $RG_N$=DOWN or may not receive this grant. For this feature, if another $RG_N$=DOWN is not received for the jth HARQ process, then $R_{max,j}^{n+1}$=MIN($R_{max,i}^{n+1}$, $R_{actual,j}^n$).

For the jth HARQ process, the terminal may receive another $RG_N$=DOWN or may not receive this grant. For this feature, if another $RG_N$=DOWN is received for the jth HARQ process, then $R_{max,j}^{n+1}$=MIN($R_{max,i}^{n+1}$, $R_{actual,j}^n$-$\Delta$). Also, the grant $RG_N$=DOWN received for the ith HARQ process will not have an effect on subsequent HARQ processes any more, and the grant $RG_N$=DOWN received for the jth HARQ process will have an effect on transmission of subsequent HARQ processes, wherein $R_{actual,j}^n$ represents the amount of actually used transmission for the jth HARQ process in the nth round of transmission, $R_{max,j}^{n+1}$ represents the maximum amount of available resources for the jth HARQ process in the (n+1)th round of transmission. The terminal determines the maximum amount of available resources for the jth HARQ process in the (n+1)th round of transmission based on $R_{max,i}^{n+1}$ and the current actual status.

Figure 3:
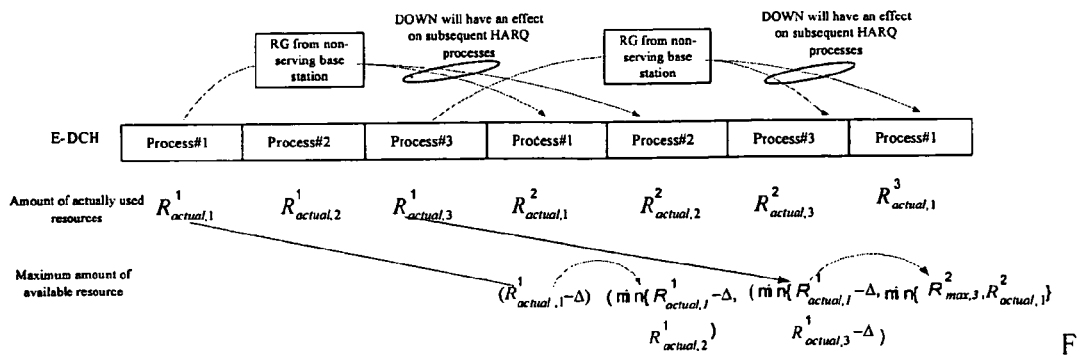
FIG. 3 is an operation schematic diagram for the cases whether a new grant $RG_N$=DOWN is received for a subsequent HARQ process in accordance with the present invention.
Figure 4:
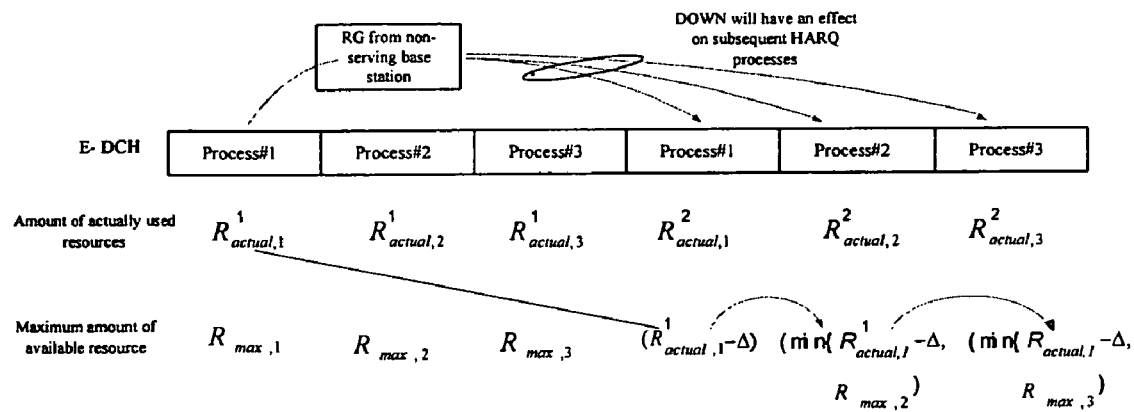
FIG. 4 is an operation schematic diagram for one-off adjusting the maximum amount of available resources for all subsequent HARQ processes in accordance with the present invention.

As shown in FIG. 3, assume that the terminal receives $RG_N$=DOWN at the first HARQ process, and then the terminal performs the following processes:

For the first HARQ process, the terminal determines the maximum amount of available resources in the second round of transmission as $R_{max,1}^2$=$R_{actual,1}^1$-$\Delta$. Finally, the terminal determines the amount of actual available resources $R_{actual,1}^2$ for the first HARQ process in the second round of transmission based on $R_{max,1}^2$ and the current actual status.

For the second HARQ process, if $RG_N$=DOWN is not received, the terminal determines the maximum amount of available resources for the HARQ process in the second round of transmission as $R_{max,2}^2$=MIN($R_{max,1}^2$, $R_{actual,2}^1$) and determines the resultant amount of actual available resources for the second HARQ process in the second round of transmission based on $R_{max,2}^2$ and the current actual status.

For the third HARQ process, if $RG_N$=DOWN is received, the terminal determines the maximum amount of available resources for the HARQ process in the second round of transmission as $R_{max,3}^2$=min($R_{max,1}^2$, $R_{actual,3}^1$-$\Delta$) and determines the resultant amount of actual available resources $R_{actual,3}^2$ for the third HARQ process in the second round of transmission based on $R_{max,3}^2$ and the current actual status.

And, for the first HARQ process, the terminal determines the maximum amount of available resources for the HARQ process in the third round of transmission as $R_{max,1}^3$=MIN($R_{max,3}^2$, $R_{actual,1}^2$) and determines the amount of available resources for the first HARQ process in the third round of transmission based on $R_{max,1}^3$.

...

III. The Processing Policy of One-Off Adjusting the Maximum Amount of Resources Used for Subsequent HARQ Processes $RG_N$=DOWN will have a effect on processing of subsequent HARQ processes, which can be reflected in one-off adjusting the maximum amount of resources used for subsequent HARQ processes. For this feature, assume that the terminal receives $RG_N$=DOWN for the ith HARQ process in the nth round of transmission, and then effects of $RG_N$ is reflected according to the following policy:

$R_{max,j}$=MIN($R_{actual,i}$-$\Delta$,$R_{max,j}$), j=1,2,...,N wherein N represents the number of HARQ processes, j represents the jth subsequent HARQ process, $R_{actual,i}$ represents the amount of actual resources used for the ith HARQ process in the nth round of transmission, $R_{max,j}$ represents the maximum amount of available resources for the jth HARQ process in the (n+1)th round of transmission.

The processing policy can reduces intense fluctuation in a terminal rate.

The technical solution proposed in the present invention has the following features:

1) If a terminal user receives ACK, $RG_N$ will be applied to subsequent HARQ processes until a new scheduling grant is received. The policy reflects the following provisions of 3GPP:

$RG_N$=DOWN is applied to a plurality of HARQ processes.

The terminal will be held for a stable period.

Any $RG_N$=DOWN will result in reset of the stable period.

2) If a terminal user receives NACK, the user will integratedly consider the initial transmission power of the packet and effects of $RG_N$. The policy reflects the following provisions of 3GPP:

The power used for the initial transmission will be considered for retransmission if allowed.

De-boosting can be considered for retransmission so as to utilize gain of HARQ while reducing transmission power.

3) The effects of $RG_N$=DOWN on subsequent HARQ processes can be reflected step by step and are associated with whether $RG_N$=DOWN is received for a subsequent HARQ process. If it is not received, the effects will be remained, otherwise the effects of the previous $RG_N$=DOWN on subsequent HARQ process is in end and it is a new received $RG_N$=DOWN imposed on subsequent HARQ processes. The present invention reflects the policy to reduce intense fluctuation in a UE rate 4) After the terminal receives $RG_N$=DOWN, the maximum amount of available resources for all subsequence HARQ processes in the next round of transmission is adjusted to reduce intense fluctuation in a terminal rate.

Figure 5:
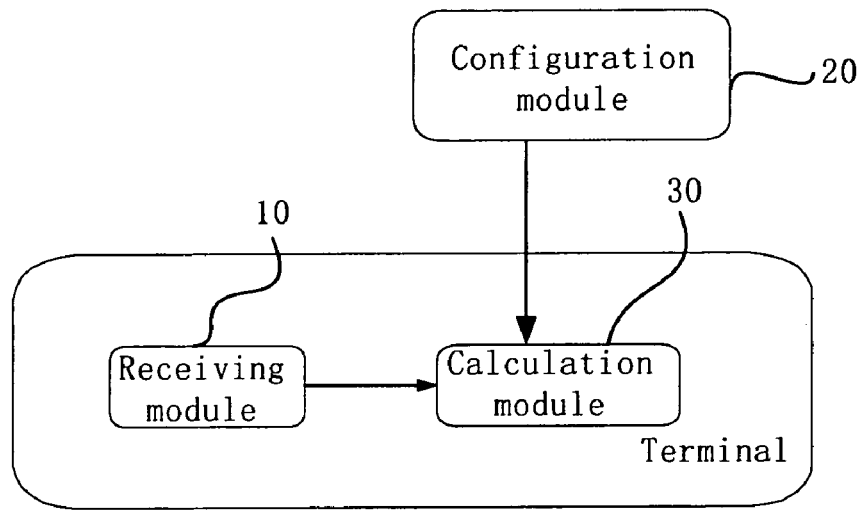
FIG. 5 is a structure schematic diagram of an apparatus for operation of a terminal based on Relative Grant of a non-serving based station of the present invention.

As shown in FIG. 5, the present invention also provides an apparatus for operation of a terminal based on Relative Grant of a non-serving based station, comprising a receiving module 10 for receiving a relative scheduling grant and associated information from the non-serving base station; a configuration module 20 for configuring associated parameters by SRNC; a calculation module 30, respectively coupled to the above modules, for enabling the terminal to perform corresponding operations based on the received relative scheduling grant and the configured parameters of the SRNC.

The above embodiments of the present invention have been presented by way of example only, and not limitation. It should be noted that various changes and modifications could be made by those skilled in the art herein without departing from the sprit and scope of the invention. Therefore, all equivalent technical solutions should belong to the scope of the present invention which should be limited by the attached claims.

The invention claimed is:

1. A method for operation of a terminal based on Relative Grant ($RG_N$) of a non-serving base station, the method comprising:
the terminal performing corresponding processes based on the received relative scheduling grant $RG_N$ from the non-serving base station, according to associated parameters configured by Serving Radio Network Controller (SRNC);
wherein when the terminal further receives a HARQ feedback result and the HARQ feedback result is incorrect response, the corresponding process performed by the terminal is determining an amount of resources used for retransmission by integratedly balancing an amount of transmission resources used for the HARQ process corresponding to the HARQ feedback and effects of the relative scheduling grant $RG_N$=DOWN on the HARQ process.

2. The method of claim 1, wherein when the terminal further receives a Hybrid Automatic Retransmission Request (HARQ) feedback result and the HARQ feedback result is a correct response, the corresponding process is the relative scheduling grant $RG_N$ being applied to subsequent HARQ processes until a new relative scheduling grant $RG_N$ is received.

3. The method of claim 1, wherein when the terminal receives $RG_N$=DOWN, the corresponding process is adjusting the amount of resources used for the HARQ process, recording a value of the adjusted amount, when the amount of resources for a subsequent HARQ process is determined, comparing the recorded value with the amount of resources used for the HARQ process with amount of resources to be determined in a previous round of transmission and the minimum is set as the maximum amount of available resources currently used for the HARQ process.

4. The method of claim 1, wherein when the terminal receives $RG_N$=DOWN, the corresponding process is adjusting the amount of resources used for the HARQ process, recording a value of the adjusted amount, and adjusting the maximum amount of available resources for a subsequent HARQ process as the value.

5. The method of claim 1, wherein when $RG_N$=DOWN and the terminal further receives a Hybrid Automatic Retransmission Request (HARQ) feedback result of correct response, the corresponding process is the relative scheduling grant $RG_N$ being applied to subsequent HARQ processes until a new relative scheduling grant $RG_N$ is received.

6. The method of claim 5, wherein if the relative scheduling grant is DOWN, the amount of resources $R_{actual,i}^n$ used for the HARQ processes corresponding to the $RG_N$ in a previous round of transmission is obtained by the calculation module and the value of the amount is modified by the calculation module with a pre-configured adjusting step size $\Delta$ to obtain the amount of available resources for the HARQ processes in a next round of transmission as:

$$R_i^{n+1} = R_{actual,i}^n - \Delta$$

wherein i represents the ith HARQ process, n represents the nth round of transmission, $R_i^{n+1}$ represents the maximum amount of available resources for the ith HARQ process in the n+1th round, $R_i^{n+1}$ will be applied to HARQ Process i+1, HARQ Process i+2, . . . until a new relative scheduling grant $RG_N$ is received; the terminal determines the resultant amount of available resources $R_{acutal,i}^{n+1}$, $R_{acutal,i}^{n+1}$ in the n+1th round based on $R_j^{n+1}$, j=i, i+1, i+2, . . . and current actual status of the terminal.

7. The method of claim 1, wherein when $RG_N$=DOWN for a first Hybrid Automatic Retransmission Request (HARQ) process at the beginning of a second round of transmission and the terminal receives incorrect response as HARQ feedback result for a second HARQ process, the terminal determines an amount of available resources for the second HARQ process in the second round of transmission as $R_2^2$=MIN($R_{actual,2}^1$, $R_1^2$), and determines a resultant amount of available resources $R_{actual,2}^2$ based on $R_2^2$ and a current actual status of the terminal, where $R_{actual,i}^n$ represents an actual amount of available resources for the ith HARQ process in the nth round and $R_1^2$ represents an amount of available resources for the first HARQ process in the second round.

8. The method of claim 1, wherein when $RG_N$=DOWN at the ith Hybrid Automatic Retransmission Request (HARQ) process, the terminal adjusts a maximum amount of current available transmission resources in the n+1th round of transmission as $R_{max,i}^{n+1} = R_{actual,i}^n - \Delta$, wherein $R_{actual,i}^n$ represents the amount of resources actually used for the ith HARQ process in the nth round of transmission and $\Delta$ is a pre-configured adjusting step size, and the terminal determines the amount of actual available resources for the ith HARQ process in the n+1th round of transmission based on $R_{max,i}^{n+1}$ and the current actual status.

9. The method of claim 8, wherein for a subsequent HARQ process, if another $RG_N$=DOWN is not received for the jth HARQ process, then a maximum amount of available transmission resources in the n+1th round of transmission at the jth HARQ process is $R_{max,j}^{n+1}$=MIN($R_{max,i}^{n+1}$, $R_{actual,j}^n$).

10. The method of claim 8, wherein for a subsequent HARQ process, if another $RG_N$=DOWN is received for the jth HARQ process, then a maximum amount of available transmission resources in the n+1th round of transmission at the jth HARQ process is $R_{max,j}^{n+1}$=MIN($R_{max,i}^{n+1}$, $R_{actual,j}^n - \Delta$).

11. The method of claim 1, wherein when the terminal receives $RG_N$=DOWN for the ith HARQ process in the nth round of transmission, then $R_{max,j}$=MIN($R_{actual,i}-\Delta$, $R_{max,j}$), j=1, 2, . . . , N
wherein N represents the number of HARQ processes, j represents the jth subsequent HARQ process, $R_{actual,i}$ represents the amount of actual resources used for the ith HARQ process in the nth round of transmission, and $R_{max,j}$ represents the maximum amount of available resources for the jth HARQ process in the (n+1)th round of transmission.

12. A method for operation of a terminal based on Relative Grant ($RG_N$) of a non-serving based station, the method comprising:
the terminal performing corresponding processes based on the received relative scheduling grant $RG_N$ from the non-serving base station, according to associated parameters configured by Serving Radio Network Controller (SRNC);
wherein if the relative scheduling grant $RG_N$ is DOWN, an amount of resources $R_{actual,i}^n$ used for the HARQ processes corresponding to the $RG_N$ in a previous round of transmission is obtained and the value of the amount is modified with a pre-configured adjusting step size $\Delta$ to obtain the amount of available resources for the HARQ processes in a next round of transmission as:

$$R_i^{n+1}=R_{actual,i}^n-\Delta \qquad (1)$$

wherein i represents the ith HARQ process, n represents the nth round of transmission, $R_i^{n+1}$ represents the maximum amount of available resources for the ith HARQ process in the n+1th round,
$R_i^{n+1}$ will be applied to HARQ Process i+1, HARQ Process i+2, . . . until a new relative scheduling grant $RG_N$ is received; the terminal determines the resultant amount of available resources $R_{acutal,i}^{n+1}$, $R_{acutal,i+1}^{n+1}$ in the n+1th round based on $R_j^{n+1}$, j=i, i+1, i+2, . . . and current actual status of the terminal.

13. An apparatus for operation of a terminal based on Relative Grant ($RG_N$) of a non-serving base station, comprising:
a receiving module for receiving a relative scheduling grant and associated information from the non-serving base station;
a configuration module for configuring associated parameters by a Serving Radio Network Controller (SRNC); and
a calculation module, respectively coupled to the receiving and configuration modules, for enabling the terminal to perform corresponding operations based on the received relative scheduling grant and the configured parameters of the SRNC;
wherein when the terminal further receives a HARQ feedback result by the receiving module and the HARQ feedback result is incorrect response, the corresponding operation performed by the calculation module is determining the amount of resources used for retransmission by integratedly balancing amount of transmission resources used for the HARQ process corresponding to the HARQ feedback and effects of the relative scheduling grant $RG_N$=DOWN on the HARQ process.

14. The apparatus of claim 13, wherein when the receiving module receives a Hybrid Automatic Retransmission Request (HARQ) feedback result and the HARQ feedback result is correct response, the corresponding operation is the relative scheduling grant being applied to subsequent HARQ processes by the calculation module until a new relative scheduling grant is received.

15. The apparatus of claim 13, wherein when the receiving module receives $RG_N$=DOWN, the corresponding process performed by the calculation module is adjusting the amount of resources used for the HARQ process, recording a value of the adjusted amount, when the amount of resources for a subsequent HARQ process is determined, comparing the recorded value with the amount of resources used for the HARQ process with amount of resources to be determined in a previous round of transmission and the minimum is set as the maximum amount of available resources currently used for the HARQ process.

16. The apparatus of claim 13, wherein when the receiving module receives $RG_N$=DOWN, the corresponding process performed by the calculation module is adjusting the amount of resources used for the HARQ process, recording a value of the adjusted amount, and adjusting the maximum amount of available resources for a subsequent HARQ process as the value.

* * * * *

UNITED STATES PATENT AND TRADEMARK OFFICE
CERTIFICATE OF CORRECTION

PATENT NO. : 7,580,392 B2 Page 1 of 1
APPLICATION NO. : 11/346369
DATED : August 25, 2009
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this

Fourteenth Day of September, 2010

David J. Kappos
*Director of the United States Patent and Trademark Office*